April 30, 1946.  C. P. BOYD  2,399,197
TROUGH SUPPORTING MEANS
Original Filed Feb. 29, 1940
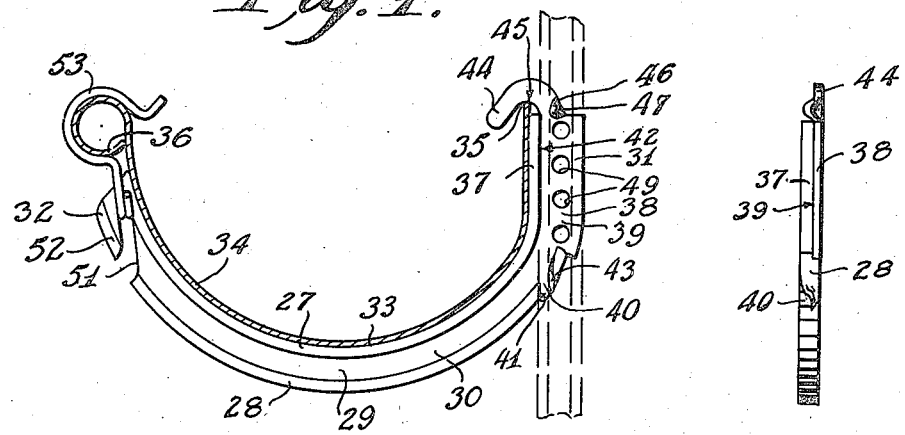
Fig. 1.
Fig. 3.
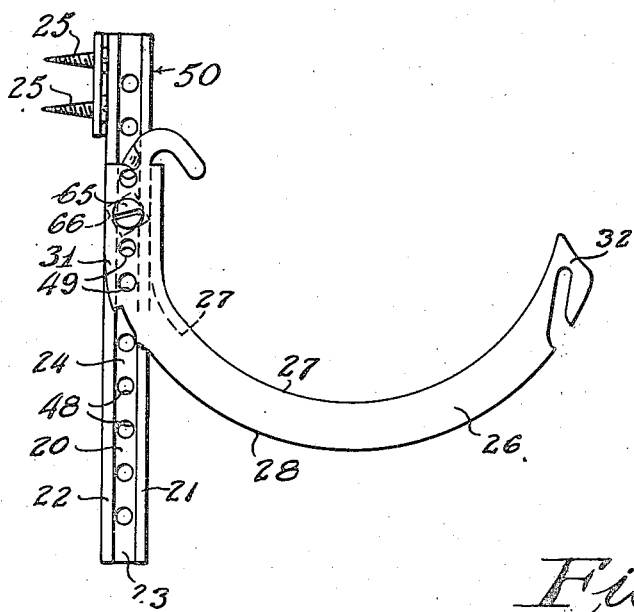
Fig. 2.
INVENTOR
Charles P. Boyd
BY Morris Michael Marks
ATTORNEY.

Patented Apr. 30, 1946

2,399,197

UNITED STATES PATENT OFFICE 2,399,197

TROUGH SUPPORTING MEANS

Charles P. Boyd, Kennett Square, Pa.

Original application February 29, 1940, Serial No. 321,535. Divided and this application November 30, 1942, Serial No. 467,349

20 Claims. (Cl. 248—48.2)

My invention relates to trough supporting means and it relates more particularly to means for supporting troughs, such as eaves troughs which are subject to intermittent light and heavy loads and extreme variations in stresses and strains due to vagaries of the weather.

In the construction and assembly of eaves troughs, because of the cantilever construction of the trough and support assembly, it is essential that the lightest materials be used. Yet the trough must be so mounted despite its lightweight and cantilever construction as to enable it to carry relatively heavy loads, as for instance, when it is filled with rain-soaked leaves and other debris, or when it is filled with ice. This problem becomes particularly acute in view of the varying stresses and strains to which the trough and its supporting means are subjected due to their exposure to strong winds and the eddy currents induced thereby, the expansion of ice within the trough acting against the tendency of the trough and its supports to contract due to cold, and the expansion and contraction due to vagaries of weather temperature.

Moreover, drainage of various elements together with the presence of air and water results in the corrosion of the trough and its supporting structure, thereby tending in time to weaken the trough and its supporting structure, and increasing the importance that destructive stresses and strains therein be reduced to a minimum.

In the past, various attempts have been made to solve these problems inherent in the trough-support assembly. Thus, sheet metal supports have been used, but have been generally undesirable due to their lack of strength and stability. Cast metal supports have been used but have been found too rigid and apt to crack under varying strains and stresses with respect to the trough—moreover, they have been too expensive. More recently, attempts have been made to use supports made of channel metal which is not as apt to crack under strain as the cast metal, and the cost of the raw material of which is less expensive. However, the channel metal supports of the prior art relied for their supporting sections upon unduly distorted or fatigued portions of the metal, thereby materially weakening the support. Moreover, the type of distortion hitherto in use is of an expensive nature, and tends materially to increase the price of the support until there is not much, if any, difference in cost between the channel metal support and the expensive cast metal support.

It is an object of my invention, therefore, to provide a supporting means for a trough, which shall be of maximum strength and durability, and wherein the effect of stresses and strains imposed by the weather and the varying demands upon the strength of the trough and its supports, in use, shall be minimized.

It is another object of my invention to provide means for securing the trough to the supporting structure whereby the varying strains, normally imposed in use, of one with respect to the other, will be absorbed while inhibiting fatigue or undue stress of the securing means, operably to ensure a longer life to the whole structure.

A further object of my invention is to provide a trough supporting means which shall be inexpensive to make and very easy and quick to assemble and disassemble, as well as efficient in operation.

With the above and other objects in view, my invention consists of a trough supporting means comprising a channeled metal beam or similar structure comprising spaced parallel flanges having a web disposed therebetween; means for securing said beam to a structure; a trough supporting arm comprising a channeled metal bar having parallel flanges and a web disposed therebetween; said bar having a shank formed at one end, a recess formed at the other end, and a bed disposed therebetween; said shank end comprising a limiting stop adapted to abut against one edge of a trough; means for interlocking at least one flange of said beam with at least one flange of said bar operative to prevent displacement of said bar in a downward direction about the shank end as a pivot; and means for retaining said flanges in interlocked condition.

For the purpose of illustrating my invention, I have shown in the accompanying drawing forms thereof which are at present preferred by me, since the same have been found in practice to give satisfactory and reliable results, although it is to be understood that the various instrumentalities of which my invention consists can be variously arranged and organized and that my invention is not limited to the precise arrangements and organizations of the instrumentalities as herein shown and described.

Referring to the drawing, in which like reference characters indicate like parts:

Figure 1 represents a side elevational view of a trough and trough supporting means embodying my invention.

Figure 2 represents an opposed side elevational view of a trough supporting means embodying my invention.

Figure 3 represents a rear elevational view of a "circle" embodying my invention.

According to my invention, I provide a beam or shank 20, preferably formed of channeled metal comprising spaced parallel flanges 21 and 22 projecting from one face of a web 23, and defining a channel 24. The beam 20 is secured, in a preferably substantially vertical position, to a building adjacent or just below the roof thereof, by any suitable means such as the screws 25, with the web 23 disposed substantially perpendicular to the side wall of the building.

A trough securing arm or "circle" 26 is provided, and preferably formed of channel metal of substantially the same cross-sectional size and shape as those of the beam 20, with an inner flange 27, an outer flange 28 spaced therefrom, and an intermediate web 29, defining a channel 30. The circle 26 is curved in the plane of its web 29 to form a shank end 31, a recessed end 32 and a trough receiving bed 33 therebetween. The curvature of the circle is such as to conform generally to that of a trough 34 having a straight-edge 35 and a beaded edge 36.

The shank 31 of the circle 26 is preferably uncurved, but comprises instead a straight inner flange portion 37 adjacent the uncurved web portion 38. The outer flange opposite the straight inner flange portion 37 is swaged outwardly until it is flush with the channel face 39 of the web 38, operatively to broaden the width of the shank to an additional width equal to the width of the flange 27.

A channel 40 is swaged downwardly through the outer flange 28 with the forward wall 41 thereof substantially coplanar with the rearward face 42 of the straight inner flange portion 37, the bed thereof coplanar with the channel face 39 of the web 29, and the rearward wall 43 thereof spaced from the forward wall 41 a distance equal to the thickness of the base of the flange 21 of the beam or shank 20.

The forward half of the web 38 projects upwardly above the upper edge of the straight inner flange portion 37 of the circle, and is curved forwardly and then downwardly to form a hook 44 having an abutting edge or limiting stop 45 adapted to bear against the straight edge 35 of the trough 34. The rearward portion 46 of the base of the hook 44 is swaged to form a bead or node 47 projecting in the same direction as the flange 37, and spaced therefrom a distance equal to the thickness of the base of the flange 21 of the beam or shank 20.

Equally spaced height adjustment orifices 48 are centrally disposed in the web 23 of the beam or shank 20 and extend a substantial distance therealong. Similar orifices 49 are disposed in the web 38 of the circle 26 along an axis spaced from the inner wall 42 of the flange 37 a distance equal to the distance between the outer wall 50 and the axis of the orifice 48 of the beam 20, and are spaced from each other in a manner to permit a vernier adjustment between the height of the circle 26 and that of the beam 20 when the two are assembled. Thus, when four orifices 49 are used on the circle 26 and spaced with respect to the orifices 48 of the beam 20 in the ratio of five to four, and the beam orifices 48 are spaced one-half inch apart, vernier adjustment may be made of one-eighth inch intervals.

The recessed end 32 of the circle 26 terminates a short distance below the bead 36, and comprises a recess 51 cut rearwardly and upwardly through the outer flange 28 and the web 29 of the circle 26, operably to form a hook 52 adapted to interlock with a trough-securing means such as the clip 53.

In operation, the circle 26 is mounted on the beam or shank 20 with the flanges 37 and 28 of one directed toward the flanges 21 and 22 of the other. The rearward face 42 of the straight flange 37 of the circle 20 is brought to bear against the forward face 50 of the beam flange 21, and the extended portion of the web 38 is brought to bear against the rearward beam flange 22. In this position, the forward beam flange 21 extends through the channel 40 and is snugly embraced by the walls 41 and 43 thereof. Spaced a substantial distance from the channel portion 40, the flange 22 is again embraced by the bead or node 47 of the circle web 38, in one direction, and by the extended flange 37 in the opposed direction. The circle is slid along the beam until the proper orifices are in registry for defining the desired height of the circle, and a bolt 65 is passed therethrough and secured in place by any suitable nut 66. The bolt and nut serve to maintain the desired height of the circle and to retain the circle and beam in interlocked condition. The cantilever stresses and strains however are sustained primarily not by the bolt, but by the interlocked flanges, which prevent downward rotation of the circle, and thus the tendency of the bolt to shear is minimized.

The trough 34 is thereafter mounted in the "circle" 26 with the straightedge 35 abutting the lower edge 45 of the hook 44, and with the bead 36, in general registry with the recessed end 32 of the circle. The clip 53 is then inserted into the hook 44, and engaged with the bead 36 operably to interlock the two, thereby completing the assembly of the trough and the circle.

The circle and beam may be made of any desired material such as iron, copper, mild channel steel, etc.

I am aware that the invention may be embodied in other specific forms without departing from the spirit or essential attributes thereof, and I therefore desire the present embodiments to be considered in all respects as illustrative and not restrictive, reference being had to the appended claims rather than to the foregoing description to indicate the scope of the invention.

Having thus described my invention, what I claim as new and desire to secure by Letters Patent is:

1. A trough securing means comprising a shank having a flange, and a circle comprising spaced substantially parallel flanges and a web disposed therebetween and defining a channel, said circle being adapted to support a trough, a flange of said circle being interlocked with said flange of said shank operably to prevent downward rotation of said circle about said shank as a pivot, and means to retain said circle and said shank in interlocked condition.

2. A trough securing means comprising a shank having a flange, and a circle comprising spaced flanges and a web disposed therebetween and defining a channel, said circle being adapted to support a trough, an abutment formed on said circle and adapted to interlock with said shank flange, and one of said circle flanges being adapted to bear against said shank flange in a manner to interlock with the same, and means to retain said circle and said shank in interlocked condition.

3. A trough securing means comprising a shank having a flange, and a circle comprising spaced flanges and a web disposed therebetween and defining a channel, said circle being adapted to support a trough, one of said circle flanges being adapted to bear against a shank flange, and another of said circle flanges being channeled to permit disposition therethrough of a shank flange and to interlock therewith, and means to retain said circle and said shank in interlocked condition.

4. A trough securing means including a shank comprising spaced substantially parallel flanges and a web disposed therebetween and defining a channel; and a circle comprising spaced substantially parallel flanges and a web disposed therebetween and defining a channel, said circle being adapted to support a trough; said circle being juxtaposed to said shank, with their respective channels facing each other, and a flange of one interlocked with a flange of the other; and means to retain said circle and said shank in interlocked condition.

5. A trough securing means including a shank comprising spaced substantially parallel flanges and a web disposed therebetween and defining a channel; and a circle comprising spaced substantially parallel flanges and a web disposed therebetween and defining a channel, said circle being adapted to support a trough; said circle being juxtaposed to said shank, with their respective channels facing each other, and a flange of one interlocked with the flange of the other, operably to prevent downward rotation of said circle about said shank as a pivot; and means to retain said circle and said shank in interlocked condition.

6. A trough securing means including a shank comprising spaced substantially parallel flanges and a web disposed therebetween and defining a channel; and a circle comprising spaced substantially parallel flanges and a web disposed therebetween and defining a channel, said circle being adapted to support a trough; a channel formed through one of said flanges in said circle and having a side wall adapted to interlock with one of said flanges on said shank; said circle being juxtaposed to said shank, with their respective first-mentioned channels facing each other, and a flange of said shank being juxtaposed to said side wall of said channeled circle flange, operably to interlock therewith; and means to retain said circle and said shank in interlocked condition.

7. A trough securing means including a shank comprising spaced substantially parallel flanges and a web disposed therebetween and defining a channel; and a circle comprising spaced substantially parallel flanges and a web disposed therebetween and defining a channel, said circle being adapted to support a trough; an abutment formed on said circle and adapted to interlock with one of said shank flanges, operably to prevent downward rotation of said circle about said shank as a pivot; means on said circle operable to bear against the other of said shank flanges, operable to prevent lateral rotation of said circle about said shank; said circle being juxtaposed to said shank with their respective channels facing each other, and said abutment in interlocking engagement with one of said shank flanges; means to retain said circle and said shank in interlocked condition.

8. A trough securing means including a shank comprising spaced substantially parallel flanges and a web disposed therebetween and defining a channel; and a circle comprising spaced substantially parallel flanges and a web disposed therebetween and defining a channel, said circle being adapted to support a trough; an abutment formed on said circle and adapted to interlock with one of said shank flanges; said circle being juxtaposed to said shank with their respective channels facing each other, and a flange of one interlocked with the flange of the other, and said abutment interlocked with one of said shank flanges, operably to prevent downward rotation of said circle about said shank as a pivot; and means to retain said circle and said shank in interlocked condition.

9. A trough securing means including a shank comprising spaced substantially parallel flanges and a web disposed therebetween and defining a channel; and a circle comprising spaced substantially parallel flanges and a web disposed therebetween and defining a channel, said circle being adapted to support a trough; an abutment formed on said circle and adapted to interlock with one of said shank flanges, and one of said circle flanges being adapted to bear against one of said shank flanges in a manner to interlock with the same; said circle being juxtaposed to said shank with their respective channels facing each other, and said abutment and circle flange being in interlocking engagement with at least one of said shank flanges, and means to retain said circle and said shank in interlocked condition.

10. A trough securing means including a shank comprising spaced substantially parallel flanges and a web disposed therebetween and defining a channel; and a circle comprising spaced substantially parallel flanges and a web disposed therebetween and defining a channel, said circle being adapted to support a trough; one of said circle flanges being adapted to bear against a shank flange, and another of said circle flanges being channeled; said circle being juxtaposed to said shank, with their respective first mentioned channels facing each other, a flange of one interlocked with a flange of the other, and one of said shank flanges being disposed through said channelled circle flange in interlocking engagement therewith; and means to retain said circle and said shank in interlocked condition.

11. A trough securing means comprising a circle adapted to be interlocked with a shank having a flange; said circle comprising spaced flanges and a web disposed therebetween and defining a channel; one of said circle flanges being channelled to permit disposition therethrough of said shank flange operably to interlock therewith; an abutment formed on said circle and spaced from one of said circle flanges operably to form a channel therebetween, said last-mentioned channel being adapted to embrace said shank flange operably to interlock therewith.

12. A trough securing means comprising a circle adapted to be mounted on a shank having a flange; said circle comprising spaced, substantially parallel flanges and a web disposed therebetween and defining a channel; a channel formed through one of said circle flanges and adapted to have said shank flange disposed therethrough in interlocking engagement therewith; an abutment formed on said web in spaced relation to the other of said circle flanges and defining a channel therebetween, said last-mentioned channel being adapted to have disposed therethrough said shank flange in interlocking engagement therewith.

13. A trough securing means comprising a circle adapted to be mounted on a shank having a flange; said circle comprising spaced, substantially parallel flanges and a web disposed therebetween and defining a channel; a channel formed through one of said circle flanges and adapted to have said shank flange disposed therethrough in interlocking engagement therewith; an abutment formed on said web in spaced relation to the other of said circle flanges and defining a channel therebetween, said last-mentioned channel being adapted to have disposed therethrough said shank flange in interlocking engagement therewith; and means on said circle adapted to bear against a portion of said shank operably to prevent lateral rotation of said circle about said shank.

14. A trough securing means comprising a circle adapted to be mounted on a shank having a flange; said circle comprising spaced flanges and a web disposed therebetween and defining a channel, said circle being adapted to support a trough, and a channel formed through one of said flanges in said circle and having a side wall adapted to interlock with said flange on said shank.

15. A trough securing means comprising a circle adapted to be mounted on a shank having a flange; said circle comprising spaced flanges and a web disposed therebetween and defining a channel, said circle being adapted to support a trough, one of said circle flanges being adapted to bear against said shank flange, and another of said circle flanges being channelled to permit disposition therethrough of said shank flange operably to interlock therewith.

16. A trough securing means comprising a circle adapted to be mounted on a shank having spaced substantially parallel flanges and a web disposed therebetween and defining a channel; said circle comprising spaced substantially parallel flanges and a web disposed therebetween and defining a channel, said circle being adapted to support a trough; a channel formed through one of said flanges in said circle and having a side wall adapted to interlock with one of said flanges on said shank; said circle being adapted to be juxtaposed to said shank, with their respective first-mentioned channels facing each other, and a flange of said shank juxtaposed to said side wall of said channelled circle flange, operably to interlock therewith.

17. A trough securing means comprising a circle adapted to be mounted on a shank having spaced substantially parallel flanges and a web disposed therebetween and defining a channel; said circle comprising spaced substantially parallel flanges and a web disposed therebetween and defining a channel, said circle being adapted to support a through; an abutment formed on said circle and adapted to interlock with one of said shank flanges, and one of said circle flanges being adapted to bear against one of said shank flanges in a manner to interlock with the same; said circle being adapted to be juxtaposed to said shank with their respective channels facing each other, and said abutment and circle flange in interlocking engagement with at least one of said shank flanges.

18. A trough securing means comprising a circle adapted to be mounted on a shank having spaced substantially parallel flanges and a web disposed therebetween and defining a channel; said circle comprising spaced substantially parallel flanges and a web disposed therebetween and defining a channel, said circle being adapted to support a trough; one of said circle flanges being adapted to bear against a shank flange, and another of said circle flanges being channelled; said circle being adapted to be juxtaposed to said shank, with their respective first-mentioned channels facing each other, a flange of one interlocked with a flange of the other, and one of said shank flanges being disposed through said channelled circle flange in interlocking engagement therewith.

19. Means for securing a beaded trough to a flanged shank, comprising a circle and a preformed clip, said circle comprising spaced flanges and a web disposed therebetween and having a hooked end, one of said circle flanges being adapted to bear against a shank flange, another of said circle flanges being channeled to permit disposition therethrough of a shank flange and to interlock therewith.

20. Means for securing a beaded trough to a flanged shank, comprising a circle and a preformed clip, said circle comprising spaced flanges and a web disposed therebetween and having a hooked end, one of said circle flanges being adapted to bear against a shank flange and said web having a node formed therefrom and adapted to bear against a shank flange operably to interlock therewith.

CHARLES P. BOYD.